US011106806B1

(12) United States Patent
Lyons

(10) Patent No.: US 11,106,806 B1
(45) Date of Patent: Aug. 31, 2021

(54) SYSTEM AND METHOD TO UNLOCK DIGITAL CONTENT BASED ON LOCATION-BASED PARAMETERS

(71) Applicant: Michael Lyons, Fort Worth, TX (US)

(72) Inventor: Michael Lyons, Fort Worth, TX (US)

(73) Assignee: Ticket Trust LLC, Fort Worth, TX (US)

( * ) Notice: Subject to any disclaimer, the term of this patent is extended or adjusted under 35 U.S.C. 154(b) by 0 days.

(21) Appl. No.: 17/142,113

(22) Filed: Jan. 5, 2021

(51) Int. Cl.
| | |
|---|---|
| *G06F 7/04* | (2006.01) |
| *G06F 21/62* | (2013.01) |
| *G06Q 20/12* | (2012.01) |
| *G06K 19/06* | (2006.01) |
| *G06K 7/14* | (2006.01) |

(Continued)

(52) U.S. Cl.
CPC .............. *G06F 21/62* (2013.01); *G01S 19/01* (2013.01); *G06F 21/31* (2013.01); *G06K 7/1413* (2013.01); *G06K 7/1417* (2013.01); *G06K 19/06028* (2013.01); *G06K 19/06037* (2013.01);

(Continued)

(58) Field of Classification Search
CPC ....... H04W 12/61; H04W 12/63; G06F 21/62; G06F 2221/2111; G06K 19/06037; G06K 19/01; G06K 7/1413; G06K 7/1417; G06Q 20/1235

See application file for complete search history.

(56) References Cited

U.S. PATENT DOCUMENTS 8,918,854 B1 * 12/2014 Giobbi .................... H04W 4/80
726/9
9,377,928 B2 6/2016 Johanssen
(Continued)

OTHER PUBLICATIONS

Kumar, Sandeep; Qadeer, Mohammed Abdul; Gupta, Archana; "Location based services using android"; 2009 IEEE International Conference on Internet Multimedia Services Architecture and Applications (IMSAA); Dec. 9-11, 2009; IEEE, Bangalore, India; 10.1109/IMSAA.2009.5439442; https://ieeexplore.ieee.org/abstract/document/5439442.

*Primary Examiner* — Thien M Le
(74) *Attorney, Agent, or Firm* — Kanika Radhakrishnan; Evergreen Valley Law Group

(57) ABSTRACT

A digital security system and method for unlocking digital content, comprising: receiving, from a user device, an activity data associated with assessing of at least a portion of digital content by a user, wherein the activity data is provided as at least one user input by at least one application operating on at least one user device associated with the user and, wherein the digital content is linked to predetermined location-based locking or unlocking parameters; response to the received user input, storing, by the processor, information about the user activity data and the electronic data correlated with the predetermined location-based locking or unlocking parameters in a profile associated with an account of the user; identifying, by the processor, whether the user device is in compliance with the predetermined location-based locking or unlocking parameters; determining, by the processor, if the electronic content related to the activity data linked to the user account is currently locked; and responsive to determination, applying, by the processor, the predetermined location-based locking or unlocking parameters to unlock and render the electronic content for being accessible to the user via the user device.

20 Claims, 7 Drawing Sheets

(51) Int. Cl.
  *G01S 19/01* (2010.01)
  *G06F 21/31* (2013.01)
  *H04W 12/63* (2021.01)
  *H04W 12/61* (2021.01)

(52) U.S. Cl.
  CPC .. *G06Q 20/1235* (2013.01); *G06F 2221/2111* (2013.01); *H04W 12/61* (2021.01); *H04W 12/63* (2021.01)

(56) References Cited

U.S. PATENT DOCUMENTS

| | | |
|---|---|---|
| 9,764,229 B2 | 9/2017 | Dawson |
| 10,565,619 B2 | 2/2020 | McDevitt et al. |
| 10,791,419 B2 | 9/2020 | Dal Santo et al. |
| 2004/0133908 A1* | 7/2004 | Smith ............. H04N 21/47211 725/31 |
| 2005/0251689 A1* | 11/2005 | Lee .................. H04N 21/4143 713/189 |
| 2006/0236258 A1 | 10/2006 | Othmer |
| 2015/0007334 A1* | 1/2015 | MacArthur ........ H04N 21/4627 726/26 |
| 2015/0310188 A1* | 10/2015 | Ford ................. H04L 63/0428 726/28 |
| 2016/0228745 A1* | 8/2016 | Rous .................... G16H 20/30 |
| 2019/0228675 A1* | 7/2019 | Geritz ................ G06F 16/7867 |
| 2020/0184757 A1* | 6/2020 | Moeller ................ H04L 9/3239 |
| 2020/0314166 A1 | 10/2020 | Shreyes |

* cited by examiner

SYSTEM AND METHOD TO UNLOCK DIGITAL CONTENT BASED ON LOCATION-BASED PARAMETERS

TECHNICAL FIELD

This disclosure relates to a system configured to manage digital content based on information associated with activity data. More particularly, the disclosure relates to a digital content security system and a method to unlock digital content based on the geographical location and time of a user device.

BACKGROUND

Mobile applications executing on a mobile computing device such as a smartphone may make use of the mobile computing device's ability to scan or decode machine-readable elements to obtain information on an activity, or an object, or an environment. For example, a mobile application may decode a machine-readable element to receive information that can be utilized by the mobile application and the received information may include sensitive or confidential information that needs an additional security feature from any illegal breach and use of the content.

Many security measures and products exist in guarding the access of any digital content based on location, however, these measures are not effective. In a typical example, an administrator, or distributor, or owner verifies the user and provides access rights for certain information. Often, the administrator or distributor or owner and the user are located in the same building and can perform the authentication in person. For example, the administrator can hand deliver a username and password which the user can use to open documents containing confidential information.

Authenticating users on the remote user devices, on the other hand, is difficult and overwhelmingly time-consuming for the administrator or distributor, or owner. Providing instant access or transmitting content to the stored application or information on the remote user devices exposes the information to undesired disclosure and illegal breach. To reduce security risks and prevent data loss, the administrators exercise great care when provisioning accounts for users on remote user devices. For example, the administrator may secure the document with a location-protection feature. Before an authorized user can open the document, the authorized user must communicate the location of the user device. For example, an existing location-based architecture employs a Location Information Server (LIS) to provide certified location information to the users. This architecture relies on the user directly providing the location key or location object to the administrator so that the user can only be located if he/she makes the initial contact. However, there are chances for malicious parties to replicate the mapping of the user device location and obtain the information at any convenient time.

Thus, in light of the above discussion, there is a need for a system to enable access to any secure digital content that is convenient and at the same time ensures a high level of security by using the location and time of the end user's mobile device.

BRIEF SUMMARY OF THE INVENTION

In general, exemplary embodiments of the invention concern systems and methods for unlocking location-based content to communication devices including mobile communication devices and "immobile" or stationary personal computers, and displaying the location-based accessible content on the communication device. While the invention is applicable to immobile or "wired" communication devices including computer systems, landline telephones, televisions, and set-top boxes, its application is particularly well-suited to mobile wireless communication devices (referred to hereinafter as "mobile communication device(s)" or "mobile device(s)") such as laptop and notebook computers, cellular telephones, PDAs, and any other mobile communication device having a display device and enabled to wirelessly receive data.

This disclosure describes systems and processes for unlocking or making available to consumers, digital electronic content that is associated with one or more location-based locking and/or unlocking parameter criteria. More particularly, the systems and processes described herein may correlate the location-based locking and/or unlocking parameter criteria with digital content (e.g., audio content, video content, text, images, etc.) associated with user activity. The location-based locking and/or unlocking parameter criteria with digital content includes the physical location and the temporal criteria (such as time, day of the week, date, etc.) The user activity may include particular action performed by a user, an online transaction, purchase transaction, user authentication or validation, admission or subscription to a service or entity, and so on. Upon determining that a user has satisfied the location-based locking and/or unlocking parameter criteria associated with particular digital content, the systems and processes described herein may make that content available to the user, such as by unlocking the content or providing access to that media content item. Then, the user may access that media content via a corresponding user device (e.g., a mobile device).

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, some structures and components are shown in block diagram form in order to avoid obscuring the concepts of the subject technology.

Figure 1:
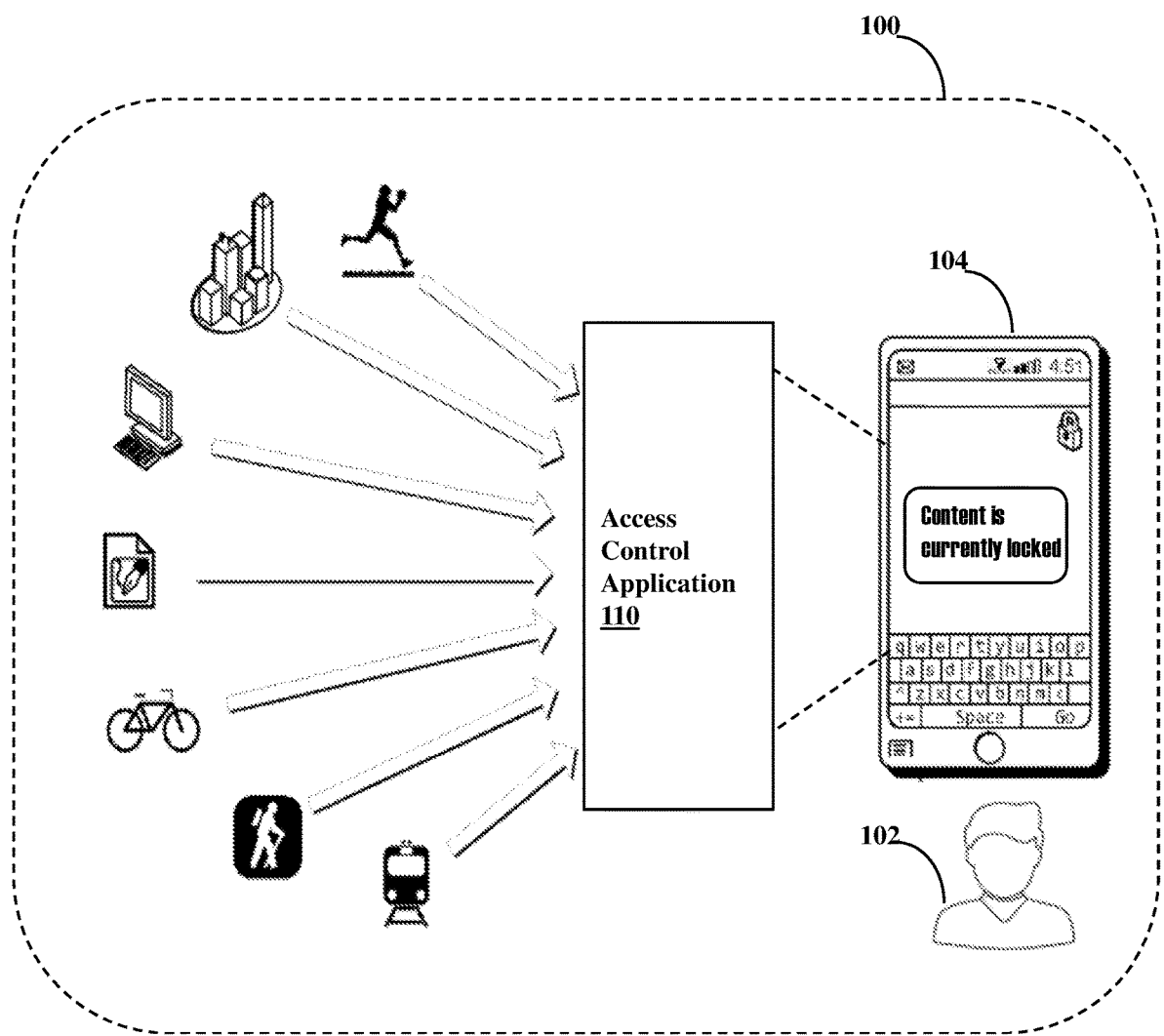
FIG. 1 illustrates an exemplary environment of the digital security system, according to the embodiments as disclosed herein.

FIG. 1 illustrates an example environment of the digital security system 100 where a mobile device 104 operated by a user 102 requests for access to digital or electronic content corresponding to a user's activity performed with the mobile device. The user activity may include any online transaction or a purchase transaction, or a subscription or an admission associated with the user, or a particular action performed by a user. For example, user activity data may include purchase transactions of a ticket for a movie, an event, a public transit, a marathon, a physical activity, media content, e-content, etc.

According to an embodiment, the request to the digital content relates to a content item that is associated with locking and/or unlocking parameters. The locking and/or unlocking parameters include both the physical location and temporal criteria (e.g., time of day, day of the week, date, etc.) for accessing the digital content. The digital content may be audio content, video content, text, images, etc. The locking and/or unlocking parameters are configured as the determining criteria for accessing the digital content by the user 102. According to an embodiment, the locking and/or unlocking parameters are predetermined by the content provider. For example, the pass to an event includes the location and time for the event as specified by the event manager or host.

An access control application 110 or operating system of the mobile device may obtain information from the memory of the user device 104 or other applications implemented by the user device 104 to track and update the user activity data. The access control application 110 may be configured to collect information corresponding to the user 102 from various data streams and/or locations such as the recent history of applications executed by the user device 104 or background process executed by the user device 104. The access control application 110 may be configured to communicate with and obtain information from other applications of the user device 104. In yet other embodiments, the other applications of the user device 104 publish the information to the operating system of the mobile device or directly to the access control application 110. In some embodiments, the user may select information and/or applications to allow the access control application 110 to collect information. In some embodiments, the access control application 110 differentiates between different users of the mobile device and obtains user interaction information for the different users independently.

The access control application 110 maintains a profile for each user 102 and their user devices 104 and stores information about each user activity data and the digital data correlated with the predetermined location-based locking or unlocking parameters in a profile associated with a user account.

The access control application 110 determines if the criteria for location-based locking or unlocking parameters for accessing the digital content are satisfied by obtaining the current physical location and the time of the user device 104. In some embodiments, the criteria of location-based locking and/or unlocking parameters may include the physical location, time of the user device 104 and date. If the access control application 110 determines the criteria for location-based locking or unlocking parameters are satisfied then the access control application 110 renders and displays the digital content associated with initially performed user activity for being accessible by the user 102 through the user device 104. In case, if the access control application 110 determines criteria for location-based locking or unlocking parameters are not satisfied, then the access control application 110 denies the access to the digital content and may transmit an error message.

In some embodiments, the activity data is associated to the digital content may be linked to a digital identifier such as a QR code, a serial code, a bar code, a video, a picture, a link, etc. that is accessible only at a predetermined location, time, and date. The access control application 110 may tag and store the identifier information along the user activity data in the profile of the associated user account. To determine the criteria for location-based locking or unlocking parameters the access control application 110 may activate a display of the user device linked to the digital identifier or may prompt the user to scan the tag related to the digital content. After scanning of the tag or the code by the user 102 through the user device 104, if the access control application 110 determines that the criteria for location-based locking or unlocking parameters are satisfied then access control application 110 renders and displays the digital content associated with initially performed user activity for being accessible by the user through the user device. In case, if the access control application 110 determines criteria for location-based locking or unlocking parameters are not satisfied, then the access control application 110 denies access to the digital content and may transmit an error message.

The user device 104 may be operating in accordance with a corresponding operating system such as a version of an Android® operating system, a Windows® phone operating system or an Apple® iOS operating system, although the techniques of the present disclosure are not limited to those operating systems discussed explicitly herein. The user device 104 may be the computing device described below in connection with FIG. 6, or may be a computing device incorporating components of the device described above in connection with FIG. 6. For example, the user device 104 may be a smartphone or tablet computing device, although the techniques described in connection with FIG. 1 are not limited to such devices. As described in greater detail below, the user device 104 may include a variety of sensors such as GPS sensors, cameras, and accelerometers. The various sensors may be used to collect information corresponding to the user interactions with the user device 104. For, example, the physical location is determined by Global Positioning System (GPS) coordinates or through a connection to a personal area network or a connection to a Bluetooth™ terminal or a connection to a WLAN terminal or a connection to a mobile phone network.

Figure 2:
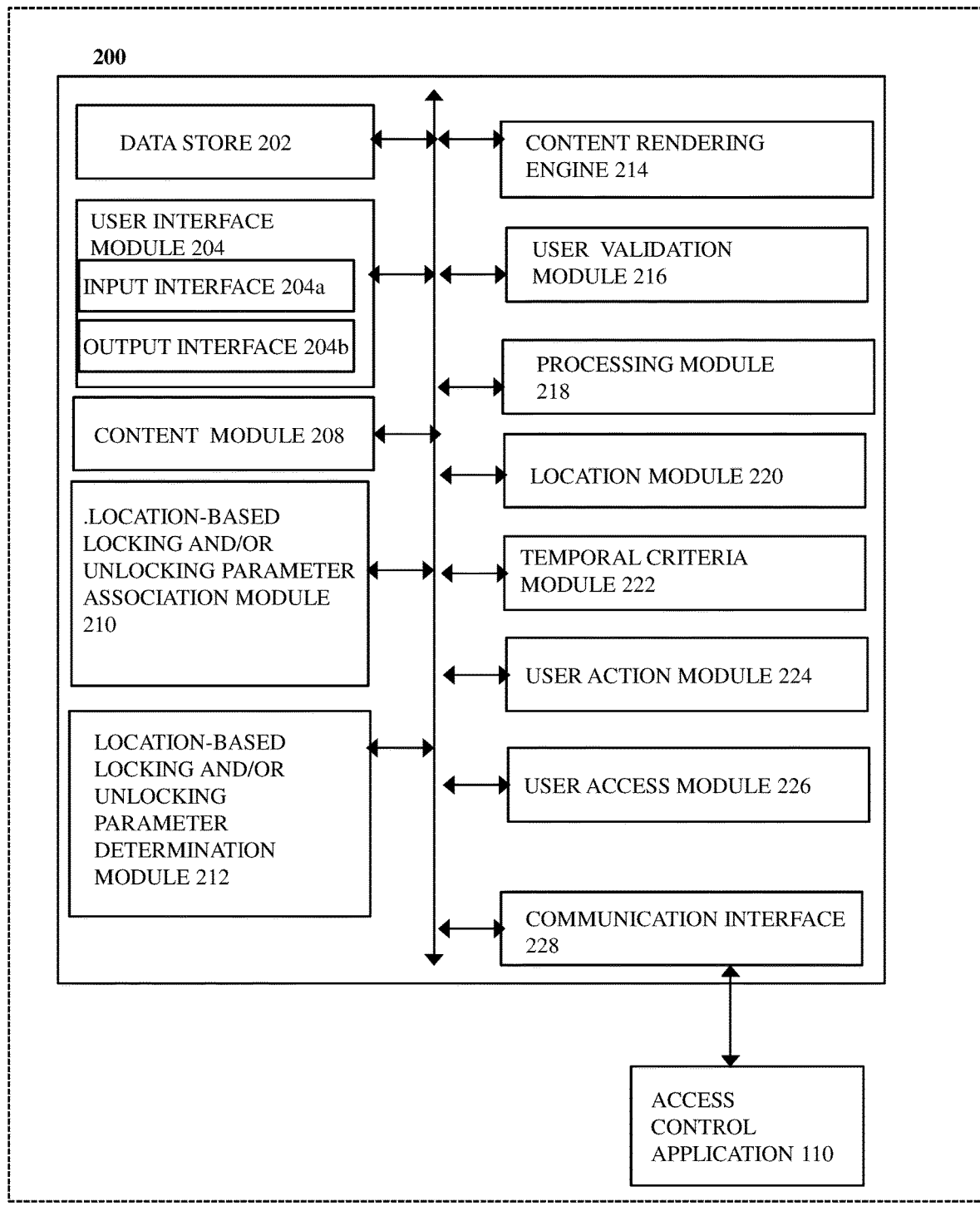
FIG. 2 illustrates a block diagram of the operating environment of the access control application, according to the embodiments as disclosed herein.

Referring to FIG. 2, a block diagram of the operating environment 200 of the access control application 110 configured by the digital security system 100. According to an embodiment, the operating environment 200 may include a software that resides on the communication devices used in conjunction with the invention. In the exemplary embodiment, the software is installed on user device 104, which is suitably equipped to establish a connection with one or more networks and send and receive data.

According to an embodiment, the access control application 110 may include a content module 220, a location-based locking and/or unlocking parameter association module 222, a location-based locking and/or unlocking parameter determination module 224, and a content presentation module 226.

According to an embodiment, the location-based locking and/or unlocking parameters of a digital content are correlated with the user activity and are available to access control application software operating on the user device 104 from multiple content sources and over various types of network connections. In one case, content providers may supply location-based content through various gateways or content providers may alternatively submit product and service content to the locked content directly to the access control application 110.

In various embodiments, the content module 208 may identify digital content (e.g., media content) that may be associated with the location-based locking and/or unlocking parameters. The digital content may be stored in a database 202 or catalog of digital content that are associated with the content module 208 or are accessible by the content module 208. As stated above with respect to FIG. 1, the digital content may include video digital content, audio digital content, text items, still images, eBooks, or other media content that can be rendered or displayed by a user device 104. For instance, the digital content may include videos, audio, images, text, eBooks, etc., that are associated with the location-based locking and/or unlocking parameters that includes the physical location and time of the user device 104 obtained from the user device by the access control application 110 and that may be unlocked when the criteria of the location-based locking and/or unlocking parameters is satisfied (e.g., a user 102 visits or is within a predetermined proximity to that physical location and at the scheduled date and time).

The content module 208 may inform the user 102 that certain digital content have become unlocked, and are therefore available to the user 102 and may send alerts or prompts that inform the user 102 that the digital content is now available.

The location-based locking and/or unlocking parameters association module 210 may associate or tag the location-based locking and/or unlocking parameter criteria with the digital content. The location-based locking and/or unlocking parameter criteria may include any actions that are to be performed by a user 102 for the purpose of unlocking the digital content. The unlocked digital content may then be accessible/available to those users 102 that actually satisfy the location-based locking and/or unlocking parameter criteria. The location-based locking and/or unlocking parameters association module 210 may be configured to associated to physical location, time and date with the digital content.

In particular, the location module 220 may determine the physical location by Global Positioning System (GPS) coordinates or through a connection to a personal area network or a connection to a Bluetooth™ terminal or a connection to a WLAN terminal or a connection to a mobile phone network. The location module 220 may associate a particular physical location, area, or region with one or more of the digital content. More particularly, the digital content may be associated with a specific address, a cross street, global positioning system (GPS) coordinates, a physical location of an entity, merchant, landmark, tourist attraction, etc., a zip code, or any other region or area.

Once identified, this physical location may be specifically associated with different digital content, such as by associating a tag (e.g., a geotag) with the digital content. In some embodiments, a physical location (e.g., an address, GPS coordinates, etc.) may be embedded within a digital content. As a result, in response to determining a current or previous physical location of a user (e.g., via a user device 104 being utilized by the user 102), the access control application 110 may determine whether the current location of the user 102 corresponds to the physical location associated with the digital content. For instance, provided GPS coordinates corresponding to a physical location have been embedded in a particular content item, the access control application 110 may determine the physical location of a user 102 based on the GPS coordinates of a corresponding user device 104 (e.g., a mobile phone or PDA). Since the GPS coordinates associated with the digital content may be registered or maintained by a service or service provider (e.g., the access control application 110), the access control application 110 may determine whether the user's 102 physical location matches the physical location associated with the digital content. If so, the digital content may be unlocked and become available to the user 102. However, if not, the user 102 may be informed that the digital content is not available at that time. Assuming that the user 102 desires to access that digital content, the access control application 110 may direct the user 102 to the physical location associated with the digital content.

In other embodiments, radio-frequency identification (RFID) may be utilized by the access control application 110. For the purposes of this discussion, RFID may correspond to the user 102 of a wireless non-contact system that uses radio-frequency electromagnetic fields to transfer data from a tag attached to an object, which may serve the purpose of automatic identification and/or tracking. RFID tags may contain electronically stored information that may be read from up to a predetermined distance. Here, the location module 220 may contain information that identifies various physical locations (e.g., tourist attractions, venues, landmarks, merchants, etc.). Moreover, a user 102 and/or a user device 104 associated therewith may include an RFID tag that enables the location module 220 to determine the current location of the user 102 and/or the user device 104. Based on the current location of a user 102, the location module 220 may transmit the location to the access control application for criteria determination.

Furthermore, matrix barcodes (e.g., a two-dimensional bar code) may be utilized to determine the physical location of users 102. One type of matrix barcodes is a Quick Response Code® (QR Code®), which may consist of black modules (i.e., square dots) that are arranged in a square grid on a white background. For the purposes of this discussion, a QR Code® may be read by an imaging device, such as a camera incorporated in a user device 104, and then interpreted by the location module 220. Since data (e.g., location data), may be extracted from the patterns present in the horizontal and vertical components of the image, the location module 220 may determine a physical location that corresponds to the QR Code®. For instance, provided that a particular QR Code® corresponds to a physical location of a merchant, venue, landmark, tourist attraction, etc., in response to determining that a user 102 has captured or scanned the QR Code® using a user device 104, the location module 220 may determine the physical location of the user 102 based on the physical location that corresponds to the QR Code®.

In additional embodiments, near field communication (NFC) may be utilized to associate location-based locking and/or unlocking parameter criteria with media content and/or to determine the current location of users 102. NFC may correspond to a set of standards for mobile devices (e.g., telephones, PDAs, eBooks, laptop computers, etc.) and other devices to establish radio communication with each other by making physical contact or by bringing the two devices in close proximity of one another. NFC may also be performed between a mobile device and an NFC chip, which may be referred to herein as an NFC tag. In some embodiments, a user device 104 of a user 102 may be considered an NFC device and a different NFC device or NFC tag may be situated at a physical location (e.g., a merchant, venue, tourist attraction, landmark, address, etc.). When the user 102 places the user device 104 within a predetermined distance from the NFC device/tag, the location module 202 may determine that the user 102 is currently located at that physical location.

The temporal criteria module 222 may associate temporal criteria with the digital content. That is, the digital content may be unlocked, and therefore be made available to users 102, based on any factor that relates to the time along with the physical location in which the users 102 attempt to access the digital content or the time in which the digital content is provided by the user device 104. With respect to the time in which the user 102 attempts to access the digital content, the digital content may be stored on the user device 104 or the digital content may be stored on, or be accessible by, the access control application 110. For instance, the availability of certain digital content may depend upon the time of day, the day of the week, etc. In addition, which media content are selected may depend upon the time of day, the day of the week, etc. For example, during a tour, the access control application 110 may make accessible a shorter digital content, or shorter version of digital content, if it is determined that the digital content will be accessed during a busy time (e.g., weekends, etc.).

In various embodiments, the digital content may be unlocked and made accessible to users 102 based on the additional location-based locking and/or unlocking parameters. For instance, the user validation module 216 may cause digital content to be unlocked in response to a user 102 authenticating or validating his or her identity to the access control application 110. That is, the location-based locking and/or unlocking parameter criteria associated with the digital content may be correlated to user authentication and/or validation. In various embodiments, in order to authenticate or validate oneself, the user 102 may provide any type of information to the user validation module 216, such as information that may not be known to other users 102 (e.g., social security number, a user-specified password, etc.). In other embodiments, the user validation module 216 may utilize facial recognition techniques to identify/validate/authenticate the user 102. That is, a user device 104 may capture an image of the user 102 and the user validation module 216 may then determine whether the content item(s) should be unlocked. In response to the user 102 providing information that uniquely identifies the user 102, the user validation module 216 may unlock and make available one or more digital content to the authenticated/validated user 102.

In other embodiments, the user action module 224 may associate location-based locking and/or unlocking parameter criteria with digital content that correspond to particular actions to be performed by users 102. For example, in order to unlock and gain access to digital content the user 102 may have to perform a specific action that is associated with those digital content. Example actions may include capturing a photo or video, uploading a photo or video, uttering a voice command, identifying a landmark, merchant, tourist attraction, etc., answering a question, or doing ten jumping jacks. Accordingly, any action that is to be performed by a user 102 may represent criteria that may be associated with a digital content at the current physical location and time obtained from the user device 104.

In some embodiments, the location-based locking and unlocking parameters criteria can include a combination of location, time, date, user action and user validation.

Moreover, the user access module 226 may restrict access to the digital content 128 to particular users 102 or to users 102 that have been authorized to unlock the digital content. For example, the user access module 226 may limit or restrict access of certain digital content to particular users 102, or to those users 102 that have performed certain actions. In some embodiments, access to certain digital content may be limited to users 102 that have obtained a subscription or have paid an admission (e.g., a user 102 paying admission to visit a museum). As a result, the location-based locking and/or unlocking parameters criteria associated with a digital content may be satisfied by a limited number of users 102.

The location-based locking and/or unlocking parameter criteria determination module 224 may determine whether users 102 have satisfied the location-based locking and/or unlocking parameter criteria associated with digital content. If it is determined that a user 102 has satisfied certain location-based locking and/or unlocking parameter criteria, the digital content may be unlocked with respect to that user 102 and then made available to that user 102. On the other hand, if the criteria have not been satisfied, the users 102 may not receive access to the digital content.

Upon the digital content being available to the user 102 of the user device 104, the content rendering engine 214 may enable the user 102 to access or consume the digital content. For instance, depending upon the type of content items that are available, the user 102 may utilize the content rendering engine 214 to view video content, images, and/or text (via the user interface) and/or listen to audio content (via one or more microphones of the user device 104).

The UI module 204 is in communication with the database 202. The UI module 204 is configured to present one or more UIs for facilitating secured exchange of secured data. The UI module 204 includes an input interface 204a and an output interface 204b. The input interface 204a is configured to receive one or more documents that are to be securely stored. The input interface 204a is also configured to receive user details associated with each user. Further, the input interface 204a is also configured to receive requests for accessing one or more stored documents from one or more users (e.g., the user 102) of the system 200. Additionally, the input interface 204a is configured to receive a sharing request from the user to share the stored document with other users. Examples of the input interface 204a may include, but are not limited to, a keyboard, a mouse, a joystick, a keypad, a touch screen, soft keys, a floppy disk, a pen drive, a hard drive and the like. In an embodiment, the output interface 204b is configured to display one or more documents to the users of the system 200. The output interface 204b is also configured to facilitate sharing of the one or more documents by the users of the system 200. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The communication interface 228 is configured to enable communication with the user device by exchanging requests, responses, notifications, location information and other messages.

The processing module 216 is in communication and configured to send operating instructions with various modules of the operating environment.

Figure 3:
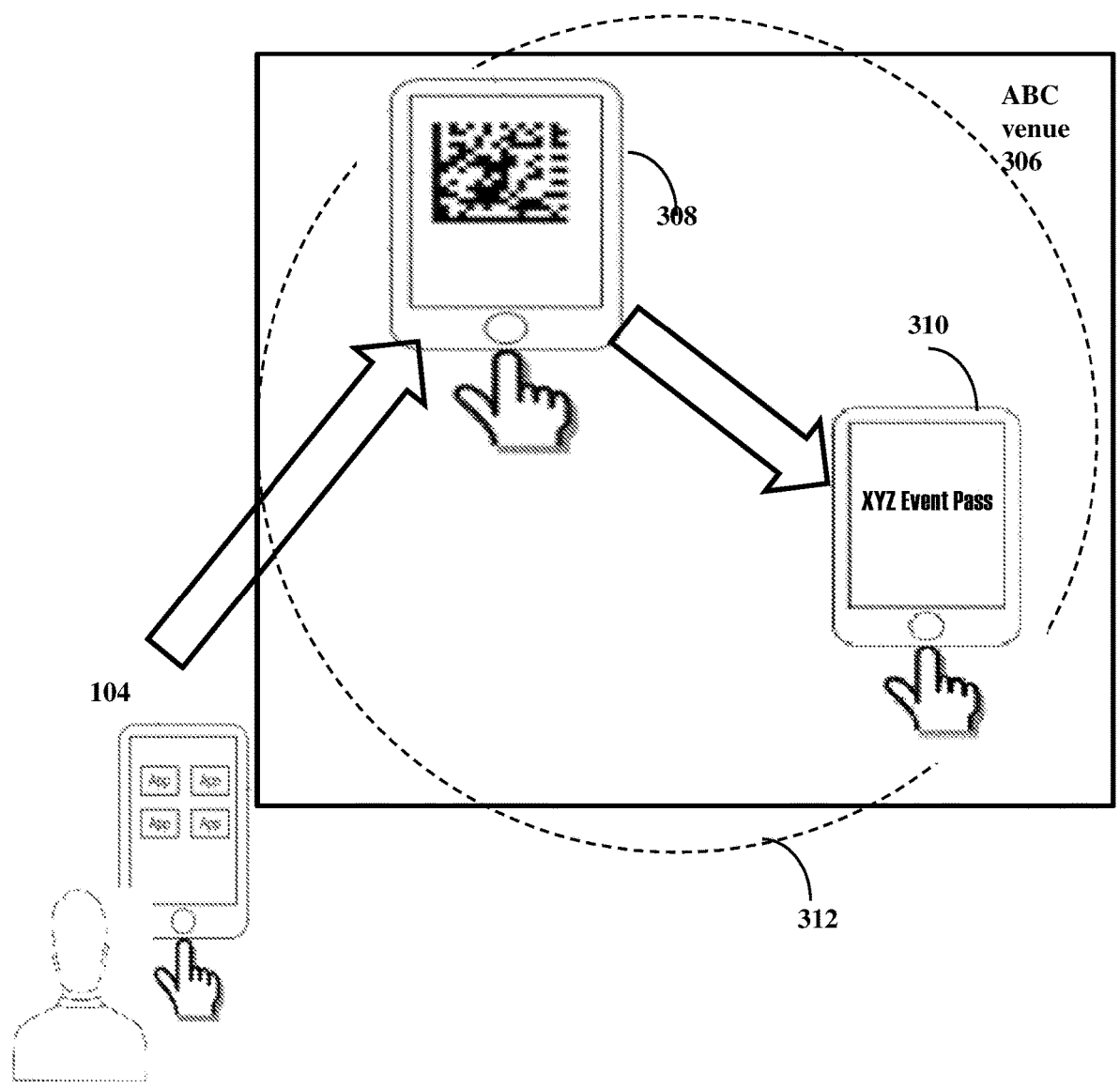
FIG. 3 illustrates an exemplary scenario of the digital security system, according to the embodiments as disclosed herein.

FIG. 3 is a diagram illustrating an exemplary scenario of accessing a virtual pass in accordance with the current embodiment. The user device 104 operated by the user 102 can be a computing device programmed to present virtual pass 310 upon entering the venue.

Venue 306 can be a stationary location (e.g., a shop in a building) or a mobile location (e.g., a food truck, cruise ship, or airplane) where the service is available. Venue 306 can be represented by virtual fence 312. Virtual fence 312 can be a conventional geofence or a proximity fence.

User device 104 can be programmed to trigger a display of virtual pass 310 upon determining that user device 104 is located at venue 306 as per the predetermined location-based locking and/or unlocking parameters criteria. The access control application 110 determines the location of the user device 104 using the location enabled features such as the GPS, Bluetooth, scanning a tag enabled at the location through a prompt screen 308 and the like. The access control application 110 then determines the time of the device and matches with the location-based locking and/or unlocking parameters criteria, in case of a match the access control application 110 renders and displays the virtual pass 310 on the user device 104. Virtual pass 310 can be a pass for accessing a service. The pass can be a text message, an image, or a one-dimensional or two-dimensional barcode readable by a barcode scanner. Some examples of virtual pass are airline or movie tickets, store cards, discount coupons, gift cards, employee passes, gymnasium access passes, or library cards.

Figure 4:
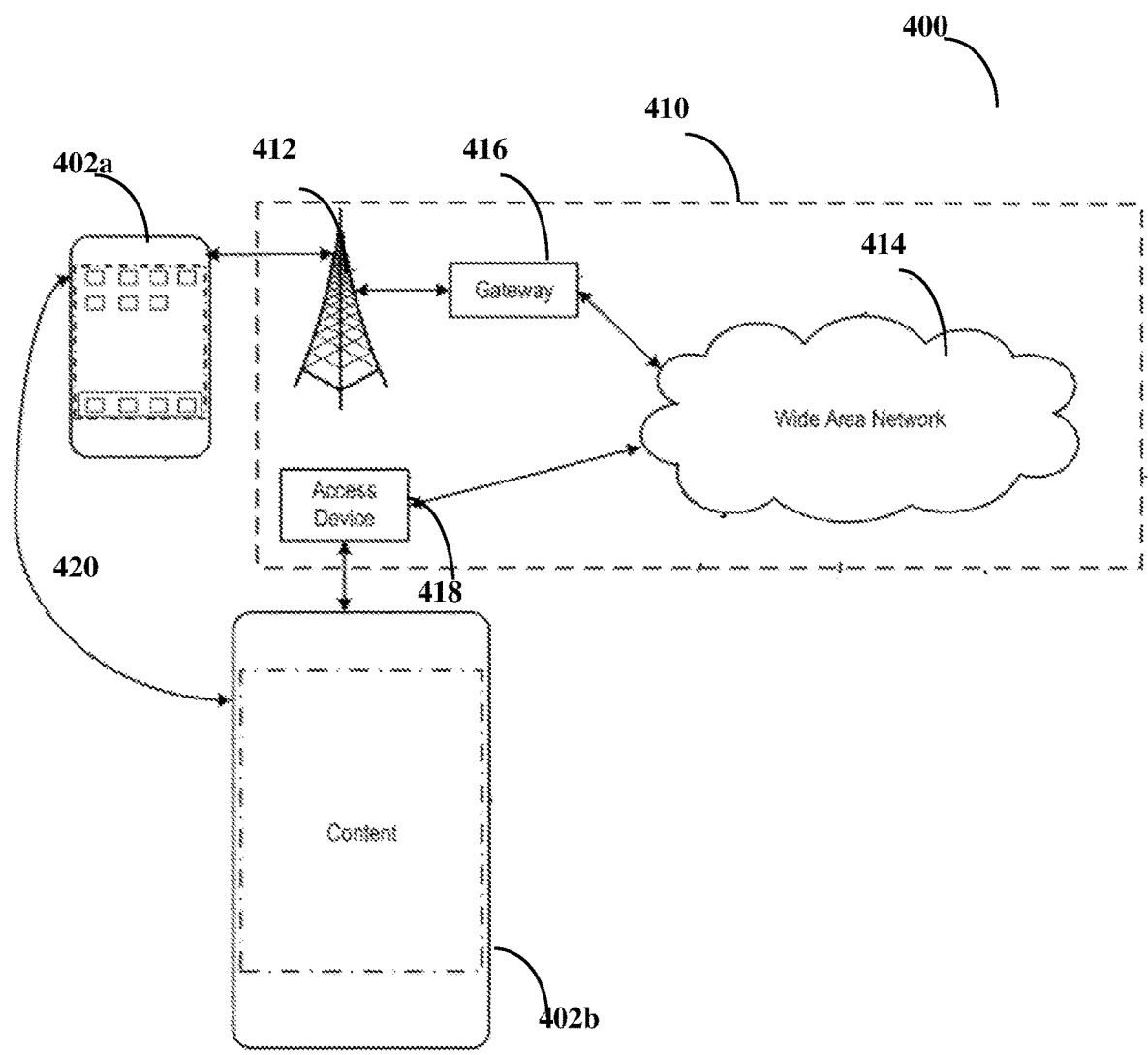
FIG. 4 illustrates a network environment of the digital security system, according to the embodiments as disclosed herein.

FIG. 4 is a block diagram of exemplary network operating environment 400 for the mobile devices implementing the features and operations of FIGS. 1-3. Mobile devices 402a and 402b can, for example, communicate over one or more wired and/or wireless networks 410 in data communication. For example, a wireless network 412, e.g., a cellular network, can communicate with a wide area network (WAN) 414, such as the Internet, by use of a gateway 416. Likewise, an access device 418, such as an 802.11g wireless access point, can provide communication access to the wide area network 414. Each of mobile devices 402a and 402b can be user device 104.

In some implementations, both voice and data communications can be established over wireless network 412 and the access device 418. For example, mobile device 402a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 412, location gateway 416, and wide area network 414 (e.g., using Transmission Control Protocol/Internet Protocol (TCP/IP) or User Datagram Protocol (UDP)). Likewise, in some implementations, the mobile device 402b can place and receive phone calls, send and receive e-mail messages, and retrieve electronic documents over the access device 418 and the wide area network 414. In some implementations, mobile device 402a or 402b can be physically connected to the access device 418 using one or more cables and the access device 418 can be a personal computer. In this configuration, mobile device 402a or 402b can be referred to as a "tethered" device.

Mobile devices 402a and 402b can also establish communications by other means. For example, wireless mobile device 402a can communicate with other wireless devices, e.g., other mobile devices, cell phones, etc., over the wireless network 412. Likewise, mobile devices 402a and 402b can establish peer-to-peer communications 420, e.g., a personal area network, by use of one or more communication subsystems, such as the Bluetooth™ communication devices. Other communication protocols and topologies can also be implemented.

Mobile device 402a or 402b can, for example, communicate with the access control application 110 over the one or more wired and/or wireless networks. For example, the user device may access the digital content using the digital security system associated with location-based locking and/or unlocking can provide criteria triggered application programs to mobile devices 402a and 402b.

Figure 5:
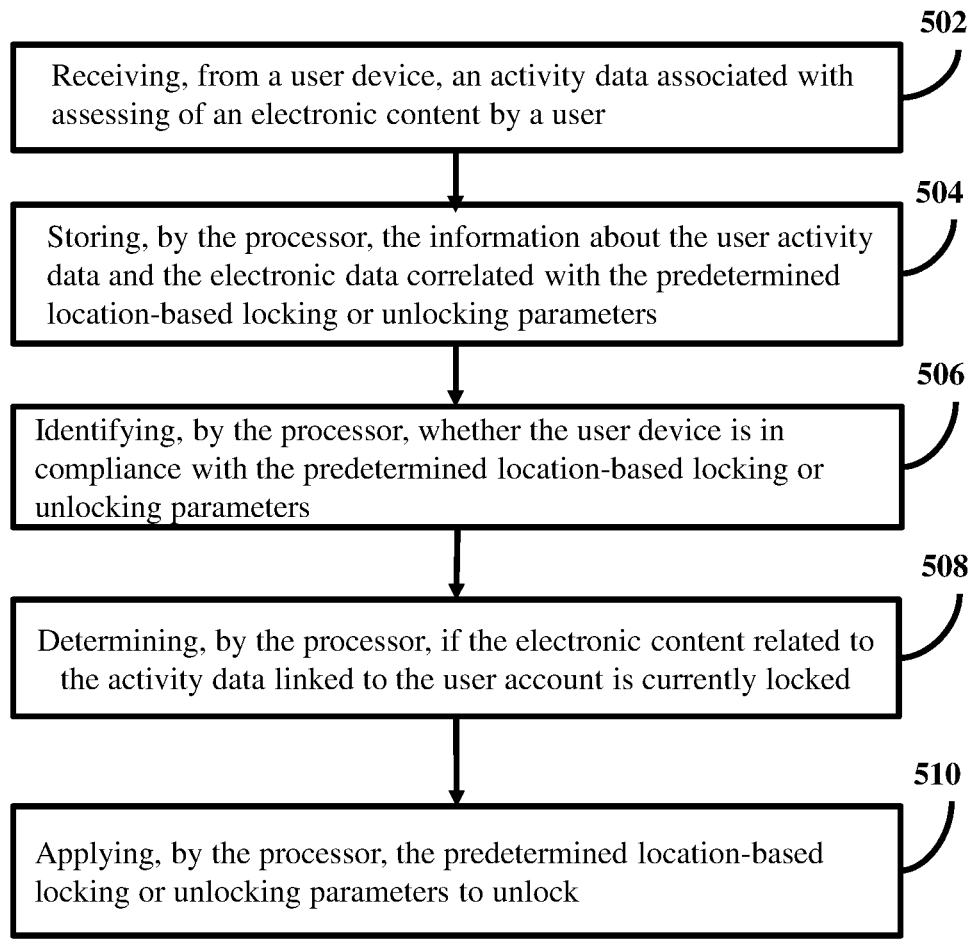
FIG. 5 is a flow diagram illustrating a method to provide digital content security based on the geographical location of a user, according to the embodiments as disclosed herein.

FIG. 5 is a flow diagram illustrating a method to provide digital content security based on the location-based locking and/or unlocking parameters criteria associated with the user activity data performed by a user 102 using the user device 104 as described in embodiments of FIGS. 1-4, At step 502, the access control application 110 receives activity data from the user device 104 for the request to access the digital content, wherein the activity data is provided as one user input by at least one application operating on the user device associated with the user and, wherein the electronic content is linked to predetermined location-based locking or unlocking parameters. At step 504, the access control application 110 stores information about the user activity data and the digital data correlated with the predetermined location-based locking or unlocking parameters in a profile associated with a user account. Wherein the predetermined location-based locking or unlocking parameters include both geographic location and the device time derived from the user device. At step 506, the access control application 110 identifies, whether the user device complies with the predetermined location-based locking or unlocking parameters. At step 508, the access control application 110 determines if the electronic content related to the activity data linked to the user account is currently locked and at step 510, the access control application 110 applies the predetermined location-based locking or unlocking parameters to unlock and render the electronic content for being accessible to the user via the user device.

Figure 6:
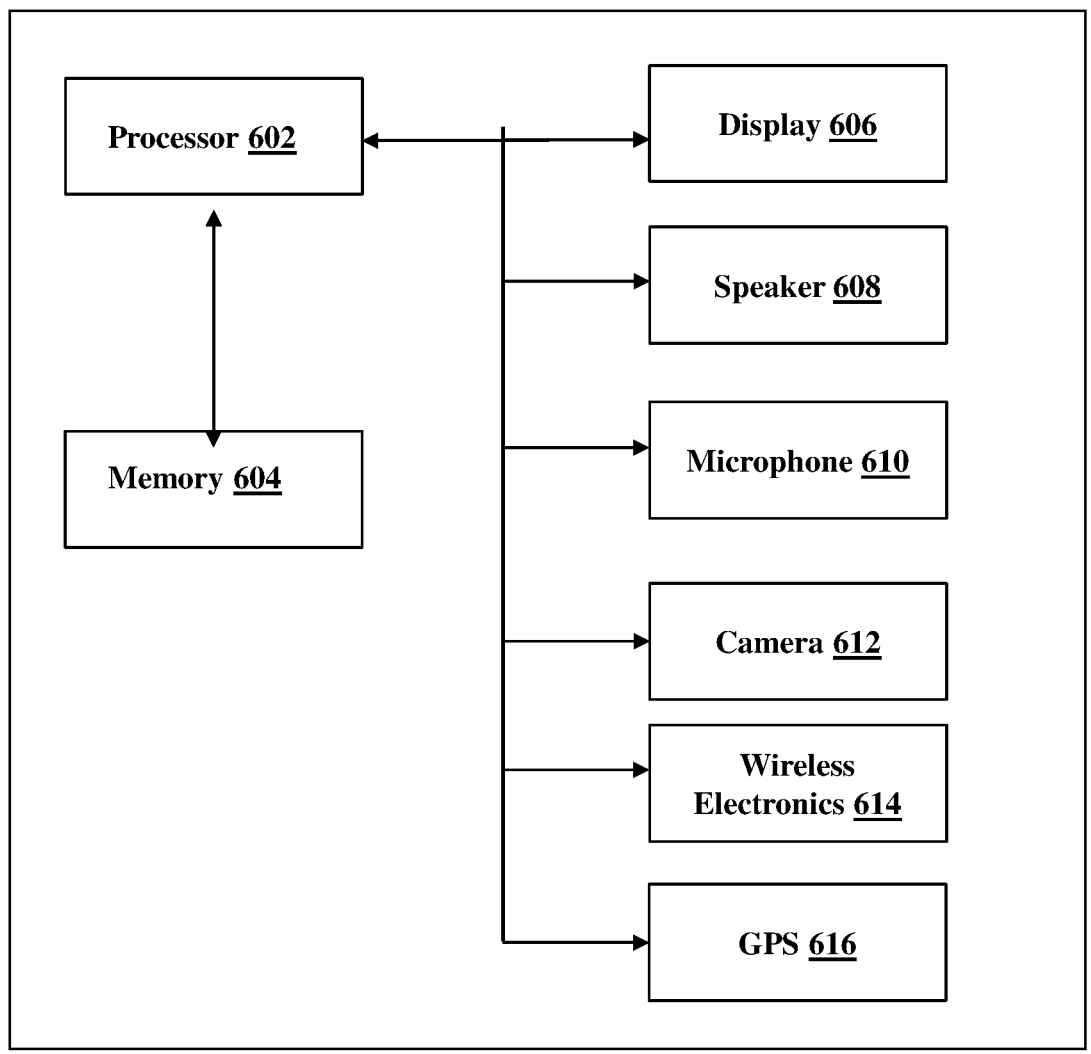
FIG. 6 is a block diagram of a machine in the example form of a user device within which instructions for causing the machine to perform any one or more of the methodologies discussed herein may be executed.

FIG. 6 depicts a non-limiting example of a mobile device 600 according to the present invention. While select components (processor 602 memory 504, display 606 (e.g. a touch screen display), speaker 608, microphone 610, camera 612, wireless electronics 614 required for wireless communication, GPS unit 616) are shown as being part of the mobile device 600, it should be noted that these components are provided as a simplistic case scenario and other known components (such as, but not limited to, a Bluetooth module, a NFC module, a RFID module), may be present within the mobile device 600. Mobile device 600 comprises: a processor 602; a display 606; and memory/storage 604 storing computer readable programmable code, which when executed by the processor implements a method to facilitate a financial transaction without unlocking a mobile device, the memory/storage 604 comprising computer readable program code to: identify the mobile device 600 is at a physical location (using for example, GPS 616); authenticate a user of the mobile device 600 as an authorized user of the mobile device through the location-based locking and/or unlocking parameter criteria (using, for example, camera 612 to passively conduct facial recognition or using touch screen display 606 to passively conduct fingerprint recognition or passively inspecting a profile stored in memory 604 or a profile stored at a network location which is downloaded to memory 604 to identify if the user has been to the location at the current derived time), and upon successful authentication: dynamically providing access to the digital content in the mobile by activating the display 606 of the mobile device 600. It should be noted that the mobile device may include any of the following: a mobile phone, a tablet, a portable gaming device or a digital music player.

Additionally, the present invention provides for an article of manufacture comprising computer readable program code contained within implementing one or more modules to facilitate a financial transaction without unlocking a mobile device. Furthermore, the present invention includes a computer program code-based product, which is a storage medium having program code stored therein which can be used to instruct a computer/processor to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Figure 7:
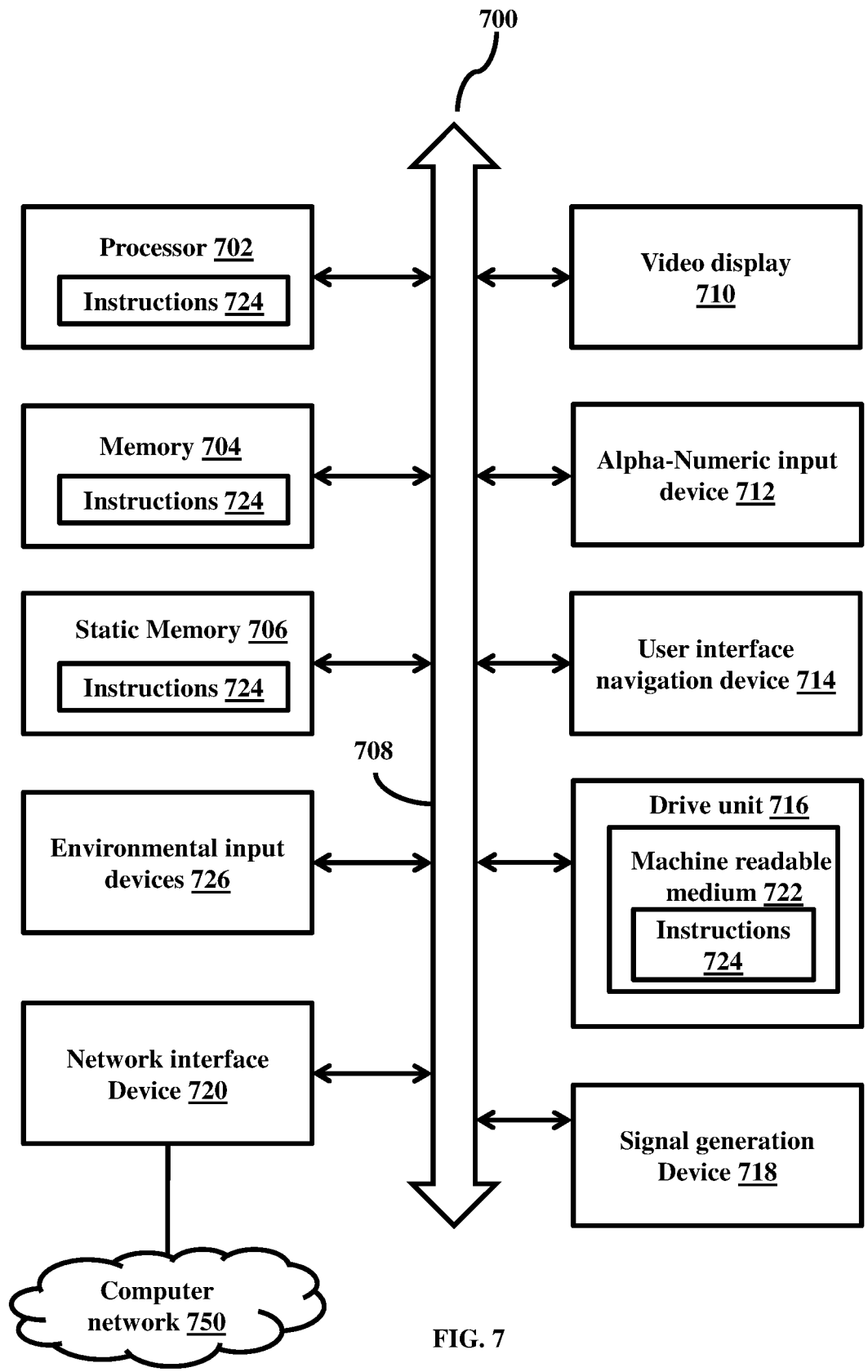
FIG. 7 is a block diagram of a machine in the example form of a computer system within which instructions for causing the machine to perform any one or more of the methodologies discussed herein may be executed.

FIG. 7 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720. The computer system 700 may also include an environmental input device 726 that may provide a number of inputs describing the environment in which the computer system 700 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

The instructions 724 may further be transmitted or received over a computer network 750 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that can store, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, Java, Swift and Objective C. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.) In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A digital security method, comprising:
   receiving, by a processor from a user device, an activity data associated with accessing of at least a portion of digital content by a user, wherein the activity data is provided as at least one user input by an application operating on the user device associated with the user and, wherein the digital content is linked to predetermined location-based locking or unlocking parameters;
   response to the received user input, storing, by the processor, information about the user activity data and the digital data correlated with the predetermined location-based locking or unlocking parameters in a profile associated with an account of the user;
   identifying, by the processor, whether the user device complies with the predetermined location-based locking or unlocking parameters;
   in response to identifying that the user device complies with the predetermined location-based locking or unlocking parameters, determining, by the processor, if the digital content related to the activity data linked to the user account is currently locked; and
   responsive to determination that the digital content is currently locked, applying, by the processor, the predetermined location-based locking or unlocking parameters to unlock and render the digital content for being accessible to the user via the user device.

2. The method of claim 1, wherein the predetermined location-based locking or unlocking parameters include both geographic location and the device time derived from the user device.

3. The method of claim 2, wherein the physical location is determined by Global Positioning System (GPS) coordinates or through a connection to a personal area network or a connection to a Bluetooth™ terminal or a connection to a WLAN terminal or a connection to a mobile phone network.

4. The method of claim 1, wherein the activity data performed by the user includes an online transaction such as a purchase transaction and the like.

5. The method of claim 1, wherein the activity data is associated to an object linked with a digital identifier such as a QR code, a serial code, a bar code, a video, a picture, a link, etc. and is accessible only at a predetermined location, time and date.

6. The method of claim 5, further includes activating a display of the user device and rendering at least one digital content linked to the digital identifier.

7. The method of claim 5, further includes prompting a user to scan a tag related to the digital content.

8. A digital security system, comprising:
   a processor;
   a memory; and
   a computer readable medium storing a computer program containing instructions executable by a processor for:
   receiving, from a user device, an activity data associated with accessing of an digital content by a user, wherein the activity data is provided as at least one user input by an application operating on the user device associated with the user and, wherein the digital content is linked to predetermined location-based locking or unlocking parameters;
   response to the received user input, storing information that indicates the user activity data of the digital data with the predetermined location-based locking or unlocking parameters in a profile associated with an account of the user;
   identifying, whether the user device is in compliance with the predetermined location-based locking or unlocking parameters;
   in response to identifying that the user device complies with the predetermined location-based locking or unlocking parameters, determining, if the digital content related to the activity data linked to the user account is currently locked; and responsive to determination that the digital content is currently locked, applying predetermined location-based locking or unlocking parameters to render and unlock the digital content for being accessible to the user via the user device.

9. The system of claim 8, wherein the predetermined location-based locking or unlocking parameters include both geographic location and the device time derived from the user device.

10. The system of claim 9, wherein the physical location is determined by Global Positioning System (GPS) coordinates or through a connection to a personal area network or a connection to a Bluetooth™ terminal or a connection to a WLAN terminal or a connection to a mobile phone network.

11. The system of claim 8, wherein the activity data performed by the user includes an online transaction such as a purchase transaction and the like.

12. The system of claim 8, wherein the activity data is associated to an object linked with a digital identifier such as a QR code, a serial code, a bar code, a video, a picture, a link, etc. and is accessible only at a predetermined location, time and date.

13. The system of claim 12, further includes activating a display of the user device and rendering at least one digital content linked to the digital identifier.

14. The system of claim 12, further includes prompting a user to scan a tag related to the digital content.

15. A computer program product comprises a computer readable hardware storage device tangible storing computer executable instructions for unlocking digital content stored on a digital media carrier device, the instructions executable by a processor device for causing the processor device for:
receiving, from a user device, an activity data associated with accessing of an digital content by a user, wherein the activity data is provided as at least one user input by an application operating on the user device associated with the user and, wherein the digital content is linked to predetermined location-based locking or unlocking parameters;
response to the received user input, storing information that indicates the user activity data of the digital data with the predetermined location-based locking or unlocking parameters in a profile associated with an account of the user;
identifying, whether the user device is in compliance with the predetermined location-based locking or unlocking parameters;
in response to identifying that the user device complies with the predetermined location-based locking or unlocking parameters, determining, if the digital content related to the activity data linked to the user account is currently locked; and
responsive to determination that the digital content is currently locked, applying predetermined location-based locking or unlocking parameters to render and unlock the digital content for being accessible to the user via the user device.

16. The computer program product of claim 15, wherein the predetermined location-based locking or unlocking parameters include both geographic location and the device time derived from the user device.

17. The computer program product of claim 16, wherein the physical location is determined by Global Positioning System (GPS) coordinates or through a connection to a personal area network or a connection to a Bluetooth™ terminal or a connection to a WLAN terminal or a connection to a mobile phone network.

18. The computer program product of claim 15, wherein the activity data performed by the user includes an online transaction such as a purchase transaction and the like.

19. The computer program product of claim 15, wherein the activity data is associated to an object linked with a digital identifier such as a QR code, a serial code, a bar code, a video, a picture, a link, etc. and is accessible only at a predetermined location, time and date.

20. The computer program product of claim 15, further includes activating a display of the user device and rendering at least one digital content linked to the digital identifier.

* * * * *